Patented Oct. 7, 1947

2,428,636

UNITED STATES PATENT OFFICE 2,428,636

COMPOSITION OF FOOD AND METHOD OF MAKING SAME

Ramon Perech, New York, N. Y.

No Drawing. Application December 30, 1944, Serial No. 570,773

10 Claims. (Cl. 99—206)

This invention relates to a new improved method of concentrating of products of vegetable origin, especially of juices of fruits like oranges, lemons, grapefruits, pineapples, tomatoes, etc., as also of milk of coconuts, coconut-water, etc.

It also provides a method of preparation of concentrates of the type more often designated as infusions or extracts of medicinal plants, coffee, different kinds of tea, and the like.

The invention has been developed in making concentrated fruit and vegetable juices included those which are prepared by as complete separation of the pulp as possible and those which include a portion or all of the pulp as a desirable part thereof.

For convenience of the disclosure and to illustrate the practice of the invention the principles therein are herein more particularly described.

Many attempts were made by the industry to concentrate vegetable juices in a way that they may be treated into a powder, flakes, etc. In order to facilitate the performance of dehydration water unsoluble substances like pectin, starch, gums, and the like have been added, but the resulting product never could be used successively, and never on the market was brought a dehydrated fruit juice product, which when mixed with water the fluid juice will contain the flavor, aroma, etc., of the juices from which the concentrate were original made.

By dehydration of citrus fruit juices it is the practice in this country to add different sugars in a proportion that the juices when dehydrated consist of 75% by weight of sugar and only of 25% of dry fruit juice solids.

In the Philippines with its highly developed coconut industry there remains yearly millions of tons of unutilized coconut milk which is thrown away as waste.

Many attempts were made to assure a successful concentration of extracts of the type known as infusions, particularly of infusion of coffee, tea, medicinal plants, etc., but the resulting products and the process of drying these kind of concentrates were unsatisfactory. The flavor and aroma of these concentrate were lost during the processing, and the performance of dehydration in the final step were complicated; the dried concentrates were hard to take out from the drying machine, and the product become caramelized. To obtain an improved dehydrated concentrate and to facilitate the method of dehydration of coffee infusions in this country sugar is added in a proportion that when the concentrate is made it consists of 50% of coffee solids and of 50% of sugar.

In accordance with the present invention, which is a continuation in part of my previous patent applications Ser. No. 493,837, filed July 8, 1943, Ser. No. 517,434, filed January 7, 1944, and Ser. No. 517,546, filed on January 8, 1944, has been discovered that the addition of a small proportion e. g. 0.2% to 6% by weight of water soluble salts of polysaccharide oxyacid ethers, greatly improves the dehydrated fruit juice concentrate, and assists the performance of dehydration process.

Many attempts have been made by the frozen food industry to provide a method of concentrating and freezing of different fruit and vegetable juices, but all these concentrates upon freezing form ice crystals and the fibrous matter becomes separated from the fluid. When thawed before using, the original fruit juice can never be restored in consistency, texture or homogeneousness. In accordance with the present invention when to the fruit or vegetable juice before concentrating was added a small proportion of water soluble salt of polysaccharide oxyacid ethers, e. g. of 0.3% by weight of the weight of the juices, the concentrate provides a smoother body and assures that when thawed the concentrate will be restored to its state before freezing.

Of the water soluble salts of polysaccharide oxyacid ethers the sodium cellulose glycolate (also referred to as sodium carboxymethylcellulose) as well sodium amylopectin glycolate, are preferred.

The water soluble salts of polysaccharide oxyacid ethers are inert physiologically and when a concentrate produced by my method of fruit or vegetable juice, of coffee, coconut milk, etc., is mixed with water it becomes an inseparable fluid beverage, like the juices or the infusions from which they were made.

The following examples will illustrate the practice of the invention:

Example 1

Take orange juice add water soluble salt of polysaccharide oxyacid ether equal to 0.4% by weight of the juice, stir until the salt of polysaccharide oxyacid ether is dissolved and homogenized with the orange juice; evaporate under 28" vacuum until 50% of the natural water content is evaporated; dry this partially dehydrated but yet fluid concentrate on drum dryer, preferably under vacuum. The final product is then ground if one desires to provide a water soluble orange powder.

Example 2

Take 100 pounds of tomato juice, add 0.3% by weight of water soluble sodium salt of polysaccharide oxyacid ether, after dissolving this sodium salt in the tomato juice or separately in water, homogenize the mixture and evaporate under vacuum 80% of the natural water content; the obtained concentrate is then dried on drum dryer, preferably under vacuum.

Example 3

Take ripe bananas of any suitable variety and treat them through a colloidal mill to form a homogeneous and practically non precipitating fluid. This fluid after adding in solution of 0.3% by weight of sodium salt of polysaccharide oxyacid ether, is evaporated and finally dried on drum dryer to produce a powdered banana product.

Example 4

Take coconut milk, add .4% by weight of water soluble salt of polysaccharide oxyacid ethers, previously dissolved in water, homogenize the mixture and evaporate the natural water under vacuum to reduce its fluidity. The obtained semi-fluid concentrate is then dried on a drum drier to produce a dry coconut milk concentrate.

Example 5

Take 5 gallons of water, mix this water with 5 pounds of roasted ground coffee and boil it preferably under vacuum and low temperature; strain the liquid through a filter and after separating the coffee solids add 20 grams per pound of roasted and ground coffee, that means 100 grams of water soluble salt of polysaccharide oxyacid ethers, which has to be previously dissolved in water or in the coffee infusion; evaporate under vacuum 80% of the water of the infusion. The partially dehydrated but yet fluid coffee concentrate dry to dryness on a drum dryer.

Instead of water any other solvent may be used.

If the fruit concentrate is to be frozen, as its final step of treatment, the dehydration is stopped when the desired consistency of the concentrate is obtained.

Spray drying or shelf drying or other drying method may be substituted for drum drying, vacuum drum drying may be substituted by atmospheric drum drying, if desired. No matter what the method by which the final drying is accomplished, the concentrates produced from juices, coconut milk, coffee concentrate, are substantially water soluble and those produced from juices or other types, containing considerable pulp are always capable by effective mixing with water to form a sufficiently stable, palatable beverage possessing the flavor, aroma, and substantially the vitamin content of the juices from which they were made. When the final drying is performed in a drum dryer the resulting product is in the form of flakes, whereas by spray drying a fine powder results, eliminating thereby the further step of grinding into a powder.

The term "water soluble salts of polysaccharide oxyacid ether" denotes sodium cellulose glycolate (also referred to as sodium carboxymethylcellulose), sodium amylopectin glycolate, as well the potassium and ammonium salts of polysaccharide oxyacid ethers.

The term "concentrate" is used herein to denote either dry, semi-dry or semi-liquid products.

The foregoing particular description of selected embodiments of the invention is illustrative merely and is not intended to be construed as defining the limits of the invention. Numerous variations may be adopted without departing from the scope of the invention.

What I claim is:

1. A readily dispersible fruit concentrate containing in substantial amount a water soluble salt of amylopectin glycolate.

2. A readily dispersible fruit concentrate containing as its principal ingredients evaporated fruit solids and water soluble sodium amylopectin glycolate.

3. A readily dispersible fruit concentrate containing as its principal ingredients evaporated fruit solids and at least about 2% of sodium amylopectin glycolate.

4. A plant infusion concentrate capable of forming when combined with water a drink having the flavor and properties of the original plant infusion, comprising as its principal ingredients evaporated infusion extract and water soluble sodium amylopectin glycolate.

5. A coffee extract concentrate capable of forming when combined with water, a palatable drink having the flavor of the original coffee extract comprising as its principal ingredients evaporated coffee extract and water soluble salt of amylopectin glycolate.

6. The method of preparing a fruit concentrate which comprises dehydrating fruit in a liquid state to remove a large part of the water, adding to the dehydrated material a water soluble salt of amylopectin glycolate and further dehydrating the mixture to substantial dryness.

7. The method of preparing a fruit concentrate which comprises both evaporating water from a fruit juice and adding to the juice water soluble salt of amylopectin glycolate.

8. The method of preparing a concentrate of plant infusion which comprises both evaporating water from plant infusion and adding to this infusion about .2% of a water-soluble salt of amylopectin glycolate.

9. A readily dispersible concentrate containing as principal ingredients evaporated tomato solids and a water-soluble salt of amylopectin glycolate.

10. A readily dispersible concentrate containing as its principal ingredients evaporated coconut milk and a water-soluble salt of amylopectin glycolate.

RAMON PERECH.